(12) United States Patent
Ofer et al.

(10) Patent No.: US 9,209,455 B2
(45) Date of Patent: Dec. 8, 2015

(54) POLYCRYSTALLINE METAL OXIDE, METHODS OF MANUFACTURE THEREOF, AND ARTICLES COMPRISING THE SAME

(75) Inventors: David Ofer, Needham, MA (US); Adrian W. Pullen, Boston, MA (US); Suresh Sriramulu, Arlington, MA (US)

(73) Assignee: TIAX LLC, Lexington, MA (US)

( * ) Notice: Subject to any disclaimer, the term of this patent is extended or adjusted under 35 U.S.C. 154(b) by 117 days.

(21) Appl. No.: 14/238,643

(22) PCT Filed: Jul. 27, 2012

(86) PCT No.: PCT/US2012/048602
§ 371 (c)(1),
(2), (4) Date: Feb. 12, 2014

(87) PCT Pub. No.: WO2013/025328
PCT Pub. Date: Feb. 21, 2013

(65) Prior Publication Data
US 2014/0197357 A1    Jul. 17, 2014

Related U.S. Application Data

(60) Provisional application No. 61/575,115, filed on Aug. 16, 2011.

(51) Int. Cl.
*H01M 4/52* (2010.01)
*H01M 4/525* (2010.01)
*H01M 4/36* (2006.01)
*C01G 51/00* (2006.01)
(Continued)

(52) U.S. Cl.
CPC ............. *H01M 4/364* (2013.01); *C01D 15/02* (2013.01); *C01G 51/42* (2013.01); *C01G 51/50* (2013.01); *C01G 53/42* (2013.01); *H01M 4/525* (2013.01); *H01M 10/0525* (2013.01); *C01P 2002/54* (2013.01); *C01P 2002/85* (2013.01); *C01P 2004/03* (2013.01); *C01P 2004/04* (2013.01); *H01M 4/505* (2013.01); *H01M 2004/021* (2013.01); *Y02E 60/122* (2013.01)

(58) Field of Classification Search
CPC ...... H01M 4/364; H01M 3/366; H01M 4/525
See application file for complete search history.

(56) References Cited

U.S. PATENT DOCUMENTS

2005/0181280 A1    8/2005    Ceder et al.
2009/0104530 A1    4/2009    Shizuka et al.

FOREIGN PATENT DOCUMENTS

JP    2008234872 A    10/2008
KR    1020100099668    9/2010

*Primary Examiner* — Peter F Godenschwager
(74) *Attorney, Agent, or Firm* — Dinsmore & Shohl LLP; Weston R. Gould

(57) ABSTRACT

A particle, including: a plurality of crystallites including a first composition having a layered α-NaFeO$_2$-type structure and including lithium in an amount of about 0.1 to about 1.3 moles, per mole of the first composition, nickel in an amount of about 0.1 to about 0.79 mole, per mole of the first composition, cobalt in an amount of 0 to about 0.5 mole, per mole of the first composition, and oxygen in an amount of about 1.7 to about 2.3 moles, per mole of the first composition; and a grain boundary between adjacent crystallites of the plurality of crystallites and including a second composition having the layered α-NaFeO$_2$-type structure, a cubic structure, or a combination thereof, wherein a concentration of cobalt in the grain boundary is greater than a concentration of cobalt in the crystallites.

14 Claims, 9 Drawing Sheets

(51) Int. Cl.
*C01G 53/00* (2006.01)
*H01M 10/0525* (2010.01)
*C01D 15/02* (2006.01)
*H01M 4/505* (2010.01)
*H01M 4/02* (2006.01)

POLYCRYSTALLINE METAL OXIDE, METHODS OF MANUFACTURE THEREOF, AND ARTICLES COMPRISING THE SAME

CROSS REFERENCE TO RELATED APPLICATION

This application is the U.S. national phase of PCT/US2012/048602, filed Jul. 27, 2012, which claims priority from U.S. provisional patent application Ser. No. 61/575,115, filed Aug. 16, 2011, the contents of each of which are incorporated herein in their entirety.

BACKGROUND (1) Field

Disclosed is a polycrystalline metal oxide, methods of manufacture thereof, and articles comprising the same.

(2) Description of the Related Art

Lithium nickel oxide ($LiNiO_2$) materials having a layered structure are desirable as lithium battery cathode materials because they generally provide lower cost, higher capacity, and higher rate capability than lithium cobalt oxide. However, pure $LiNiO_2$ materials exhibit poor electrochemical stability and cycling performance. It has been found that by substituting varying amounts of other metals for some or much of the Ni in $LiNiO_2$, some of the capacity and cost benefits of $LiNiO_2$ can be obtained with improved electrochemical cycling stability.

Accordingly, a wide variety of layered-structure lithium nickel oxides, wherein a portion of the Ni has been substituted by another metal, have been developed. In particular, cobalt (Co) incorporation is found to enhance electrochemical cycling stability, and is readily achieved because of the favorable solid-state solution interaction of lithium cobalt oxide ($LiCoO_2$) with $LiNiO_2$. However, Co is more costly than nickel (Ni), and Co incorporation in $LiNiO_2$ generally results in some diminution of the high capacity and rate capability provided by $LiNiO_2$. Therefore it would be desirable to use only as much Co as is required to confer sufficient stability to a $LiNiO_2$ to provide a lower cost material that provides more of the desirable properties of $LiNiO_2$. Thus there remains a need for a lower cost lithium battery cathode material that provides the desirable properties of $LiNiO_2$ at lower cost.

SUMMARY

A particle, including: a plurality of crystallites including a first composition having a layered $\alpha$-$NaFeO_2$-type structure and including lithium in an amount of about 0.1 to about 1.3 moles, per mole of the first composition, nickel in an amount of about 0.1 to about 0.79 mole, per mole of the first composition, cobalt in an amount of 0 to about 0.5 mole, per mole of the first composition, and oxygen in an amount of about 1.7 to about 2.3 moles, per mole of the first composition; and a grain boundary between adjacent crystallites of the plurality of crystallites and including a second composition having the layered $\alpha$-$NaFeO_2$-type structure, a cubic structure, or a combination thereof, wherein a concentration of cobalt in the grain boundary is greater than a concentration of cobalt in the crystallites.

Also disclosed is a particle, including: a plurality of crystallites including a first composition having a layered $\alpha$-$NaFeO_2$-type structure and including lithium in an amount of about 0.1 to about 1.3 moles, per mole of the first composition, nickel in an amount of about 0.91 to about 0.99 mole, per mole of the first composition, cobalt in an amount of 0 to about 0.5 mole, per mole of the first composition, and oxygen in an amount of about 1.7 to about 2.3 moles, per mole of the first composition; and a grain boundary between adjacent crystallites of the plurality of crystallites and including a second composition having a layered $\alpha$-$NaFeO_2$-type structure, a cubic structure, or a combination thereof, wherein a concentration of cobalt in the grain boundary is greater than a concentration of cobalt in the crystallites.

Also disclosed is a lithium-ion battery including at least one of the foregoing particles.

Also disclosed is a method of manufacturing a particle, the method including: combining a lithium compound, a cobalt compound, and a nickel compound to form a mixture; heat treating the mixture at about 30 to about 200° C. to form a dried mixture; heat treating the dried mixture at about 200 to about 500° C. for about 0.1 to about 5 hours; then heat treating at 600 to about 900° C. for about 0.1 to about 10 hours to manufacture the particle, wherein the particle includes a plurality of crystallites including a first composition having a layered $\alpha$-$NaFeO_2$-type structure and including Li, Ni, Co, and O, wherein the Li is present in an amount of about 0.1 to about 1.3 moles, per mole of the first composition, nickel is present in an amount of about 0.1 to about 0.79 mole or about 0.91 to about 0.99 mole, per mole of the first composition, cobalt is present in an amount of 0 to about 0.5 mole, per mole of the first composition, and oxygen is present in an amount of about 1.7 to about 2.3 moles, per mole of the first composition; and a grain boundary between adjacent crystallites of the plurality of crystallites and including a second composition having a layered $\alpha$-$NaFeO_2$-type structure, a cubic structure, or a combination thereof, wherein a concentration of cobalt in the grain boundary is greater than a concentration of cobalt in the crystallites.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
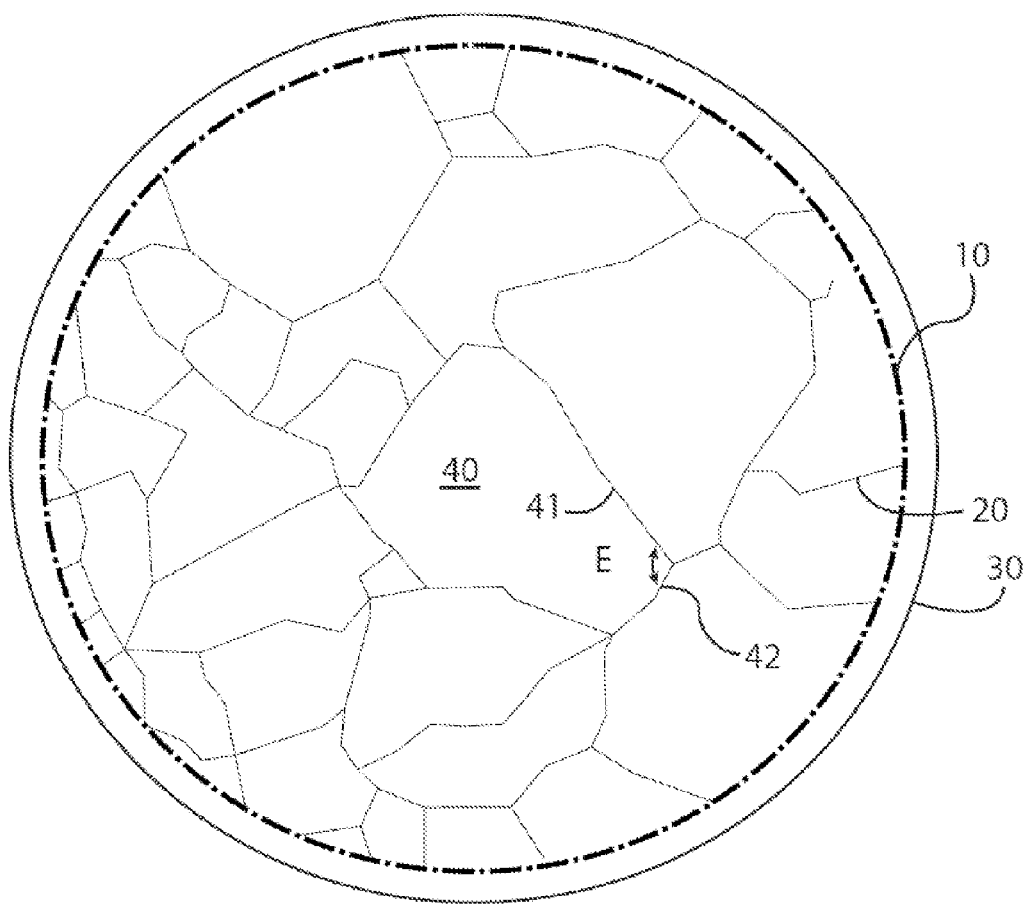
FIG. 1 is a schematic perspective view of an embodiment of a cross-section of a secondary particle.

The inventors have discovered that lithium nickel oxides having the layered α-NaFeO$_2$-type structure and having cobalt enriched grain boundaries are surprisingly stabilized. The lithium nickel oxide is in the form of a secondary particle comprising a plurality of crystallites (i.e., primary particles), wherein the cobalt enriched grain boundaries are between adjacent crystallites. Such materials may be readily manufactured by treating a lithium nickel oxide with a cobalt compound and optionally a lithium compound. The lithium nickel oxides having cobalt enriched grain boundaries have excellent electrochemical properties, including improved cycling stability and improved capacity. Because cobalt is preferentially provided in the grain boundaries, where it is understood to be most effective at stabilizing the lithium nickel oxide, less cobalt is required to provide a lithium nickel oxide having suitable stability than if cobalt is provided uniformly or at a location other than the grain boundaries. Thus a lower cost material is now available that provides more of the desirable properties of LiNiO$_2$ with less cobalt.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As shown in FIG. 1, disclosed is a particle comprising a crystallite 10 comprising a first composition, and grain boundary 20 comprising a second composition, wherein a concentration of cobalt in the grain boundary is greater than a concentration of cobalt in the crystallite. The particle comprises a plurality of crystallites, and is referred to as a secondary particle. Optionally, a layer 30 may be disposed on an outer surface of the secondary particle to provide a coated secondary particle.

The first composition of crystallite 10 has a layered α-NaFeO$_2$-type structure. In compositions having the layered α-NaFeO$_2$-type structure, hexagonal metal oxide layers are separated by planes of the alkali metal. The metal oxide layers form metal centered oxygen octahedra which are separated by alkali metal ions, and the metal oxide layers are laterally offset to provide a three-layer structure. In this structure, the alkali metal atoms occupy the so called "3a" sites in the structure (x=0, y=0, and z=0), the metal atoms occupy the "3b" sites (x=0, y=0, and z=0.5), and the oxygen atoms occupy the "6c" sites (x=0, y=0, and z=0.25). The coordinates of the atoms and the cell parameters can vary according to the composition. Compositions having this structure type may have cell parameters in which a is about 2.75 to about 2.95 angstroms (Å), and c is about 13.9 to about 14.6 Å.

In an embodiment, the first composition comprises lithium in an amount of about 0.1 to about 1.3 moles, specifically about 0.2 to about 1.2 moles, more specifically about 0.3 to about 1.1 moles, per mole of the first composition; nickel in an amount of about 0.1 to about 0.79 mole, specifically about 0.2 to about 0.7 mole, more specifically about 0.3 to about 0.6 mole, per mole of the first composition; cobalt in an amount of 0 to about 0.5 mole, specifically about 0.01 to about 0.5 mole, more specifically about 0.05 to about 0.4 mole, or about 0.1 to about 0.3 mole, per mole of the first composition; and oxygen in an amount of about 1.7 to about 2.3 moles, specifically about 1.8 to about 2.2 moles, more specifically about 1.9 to about 2.1 moles, per mole of the first composition. For example, the first composition can comprise lithium in an amount of about 0.1 to about 1.3 mole, nickel in an amount of about 0.5 to about 0.75 mole, cobalt in an amount of about 0.05 to about 0.1 mole, and oxygen in an amount of about 1.9 to about 2.1 moles, each per mole of the first composition. An embodiment in which cobalt is contained in an amount of about 0.01 to about 0.1 mole, specifically 0.05 mole, per mole of the first composition, is specifically mentioned.

In another embodiment, the first composition comprises lithium in an amount of about 0.1 to about 1.3 moles, specifically about 0.2 to about 1.2 moles, more specifically about 0.3 to about 1.1 moles, per mole of the first composition; nickel in an amount of about 0.91 to about 0.99 mole, specifically about 0.92 to about 0.98 mole, more specifically about 0.93 to about 0.97 mole, per mole of the first composition; cobalt in an amount of 0 to about 0.5 mole, specifically about 0.01 to about 0.5 mole, more specifically about 0.05 to about 0.4 mole, or about 0.1 to about 0.3 mole, per mole of the first composition; and oxygen in an amount of about 1.7 to about 2.3 moles, specifically about 1.8 to about 2.2 moles, more specifically about 1.9 to about 2.1 moles, per mole of the first composition. For example, the first composition can comprise lithium in an amount of about 0.1 to about 1.3 mole, nickel in an amount of about 0.91 to about 0.95 mole, cobalt in an amount of about 0.05 to about 0.1 mole, and oxygen in an amount of about 1.9 to about 2.1 moles, each per mole of the first composition. An embodiment in which cobalt is contained in an amount of about 0.01 to about 0.1 mole, specifically 0.08 mole, per mole of the first composition, is specifically mentioned.

In yet another embodiment, the secondary particle may comprise a first crystallite comprising lithium in an amount of about 0.1 to about 1.3 moles, nickel in an amount of about 0.1 to about 0.79 mole, cobalt in an amount of about 0.01 to about 0.5 mole, and oxygen in an amount of about 1.7 to about 2.3 moles, each per mole of the first composition of the first crystallite; and a second crystallite wherein the first composition comprises lithium in an amount of about 0.1 to about 1.3 moles, nickel in an amount of about 0.91 to about 0.99 mole, cobalt in an amount of about 0.01 to about 0.5 mole, and oxygen in an amount of about 1.7 to about 2.3 moles, each per mole of the first composition of the second crystallite.

The first composition may further comprise an additional metal, and the additional metal of the first composition may be present in an amount of about 0.01 to about 0.9 mole, specifically about 0.05 to about 0.8 mole, more specifically about 0.1 to about 0.7 mole, per mole of the first composition. In an embodiment, the additional metal may be present in an amount of about 0.01 to about 0.2 mole, specifically about 0.02 to about 0.18 mole, more specifically about 0.04 to about 0.16 mole, per mole of the first composition.

The additional metal may comprise Mg, Sr, Ca, Cu, Zn, Mn, Al, V, Ba, Zr, Ti, Cr, Fe, Mo, B, or a combination thereof. In an embodiment, the additional metal comprises Mg, Al, V, Ti, B, Zr, or Mn, or a combination thereof. In another embodiment, the additional metal consists of Mg, Al, V, Ti, B, Zr, or Mn. An embodiment in which the additional metal is Mn or Mg is specifically mentioned.

Each crystallite may have any suitable shape, which can be the same or different within each secondary particle. Further, the shape of each crystallite can be the same or different in different secondary particles. Because of its crystalline nature, the crystallite may be faceted, the crystallite may have a plurality of flat surfaces, and a shape of the crystallite may approximate a geometric shape. The crystallite may have a rectilinear shape, and when viewed in cross-section, a portion of or an entirety of the crystallite may be rectilinear. The crystallite may be square, hexagonal, rectangular, triangular, or a combination thereof. A length, a width, and a thickness of the crystallite may be selected independently, and each of the length, width, and thickness of the crystallite may be about 5 to about 1000 nanometers (nm), specifically about 10 to about 900 nm, more specifically about 20 to about 800 nm.

The grain boundary is between adjacent crystallites, is on a surface of the crystallite, and comprises the second composition. The second composition has the layered $\alpha$-NaFeO$_2$-type structure, a cubic structure, or a combination thereof. As noted above, a concentration of cobalt in the grain boundaries is greater than a concentration of cobalt in the crystallites. An embodiment in which the grain boundaries have the layered $\alpha$-NaFeO$_2$-type structure is specifically mentioned.

The shape of the grain boundary is defined by the shape of the crystallite adjacent the grain boundary. The shape of the grain boundary may approximate a geometric shape. The grain boundary may have a rectilinear shape, and when viewed in cross-section the grain boundary may be rectilinear. The grain boundary may be square, hexagonal, rectangular, triangular, or a combination thereof.

A direction of a surface of the grain boundary corresponds to a direction of a surface of the adjacent crystallite. Also, as shown in FIG. 1, the surface of the grain boundary and the surface of the crystallite may have any of a variety of orientations relative to an outer surface of the secondary particle. Thus the direction of the surface of the crystallite and the direction of the surface of the grain boundary may be parallel and be different than a direction of a nearest outer surface of the secondary particle. In an embodiment, a direction of a tangent of the nearest outer surface of the particle is different than the direction of the surface of the grain boundary and the direction of the surface of the adjacent particle.

As is also shown in FIG. 1, the grain boundaries may intersect to form an angle therebetween. In an embodiment, disposed on adjacent faces of a crystallite 40 is a first grain boundary 41 and second grain boundary 42. The first grain boundary 41 and the second grain boundary 42 intersect at an angle E. The angle E may be defined by the shape of the crystallite on which the first grain boundary 41 and the second grain boundary 42 are disposed. Generally, a shape of a crystallite is influenced by a crystal structure of the crystallite. While not wanting to be bound by theory, it is understood that because the crystal structure of the first composition governs the shape of the crystallite, the angle between the first and second grain boundaries is influenced by the crystal structure of the first composition. The first and second grain boundaries may intersect at any angle, specifically an angle of about 10 to about 170 degrees, specifically about 20 to about 160 degrees, more specifically about 30 to about 150 degrees, so long as the angle is consistent with the crystal structure of the first composition, which has the layered $\alpha$-NaFeO$_2$-type structure.

The dimensions of the grain boundary are not particularly limited. A length and a width of the grain boundary may each independently be about 50 to about 1000 nm, specifically about 60 to about 900 nm, more specifically about 70 to about 800 nm. The length and width of the grain boundaries are perpendicular to each other and are parallel to the surface of the adjacent crystallite. A thickness of the grain boundary may be about 1 to about 200 nm, specifically about 5 to about 180 nm, more specifically about 10 to about 160 nm. The thickness of the grain boundary is perpendicular to the length and the width of the grain boundary and may be perpendicular to the surface of the adjacent crystallite.

An average grain boundary length and an average grain boundary width of the plurality of grain boundaries may each independently be about 50 to about 1000 nm, specifically about 60 to about 900 nm, more specifically about 70 to about 800 nm. Also, an average grain boundary thickness of the plurality of grain boundaries may be about 1 to about 200 nm, specifically about 5 to about 180 nm, more specifically about 10 to about 160 nm.

In an embodiment, the second composition of the grain boundaries comprises lithium in an amount of about 0.1 to about 1.3 moles, specifically about 0.2 to about 1.2 moles, more specifically about 0.3 to about 1.1 moles, per mole of the second composition; nickel in an amount of about 0.1 to about 0.95 mole, specifically about 0.2 to about 0.90 mole, more specifically about 0.3 to about 0.85 mole, per mole of the second composition; cobalt in an amount of about 0.02 to about 0.99 mole, specifically about 0.04 to about 0.90 mole, more specifically about 0.06 to about 0.80 mole, per mole of the second composition; and oxygen in an amount of about 1.7 to about 2.3 moles, specifically about 1.8 to about 2.2 moles, more specifically about 1.9 to about 2.1 moles per mole of the second composition. An embodiment in which the second composition comprises nickel in an amount of about 0.1 to about 0.79 mole, per mole of the second composition, and cobalt in an amount of about 0.02 to about 0.5 mole, per mole of the second composition, is specifically mentioned.

The second composition may further comprise an additional metal, and the additional metal of the second composition may be present in an amount of about 0.01 to about 0.9 mole, specifically about 0.05 to about 0.8 mole, more specifically about 0.1 to about 0.7 mole, per mole of the second composition. In an embodiment, the additional metal of the second composition may be present in an amount of about 0.01 to about 0.2 mole, specifically about 0.02 to about 0.18 mole, more specifically about 0.04 to about 0.16 mole, per mole of the second composition.

The additional metal of the second composition may comprise Mg, Sr, Ca, Cu, Zn, Mn, Al, V, Ba, Zr, Ti, Cr, Fe, Mo, B, or a combination thereof. In an embodiment, the additional metal of the second composition comprises Mg, Al, V, Ti, B, Zr, or Mn, or a combination thereof. In another embodiment, the additional metal of the second composition consists of Mg, Al, V, Ti, B, Zr, or Mn. An embodiment in which the additional metal of the second composition is Mn or Mg is specifically mentioned. In an embodiment, the additional metal of the first composition and the additional metal of the second composition are each Mg. An embodiment in which the first composition further comprises Mn, and the Mn is present in the first composition in an amount of about 0.01 to about 0.6 mole, specifically about 0.02 to about 0.5 mole, per mole of the first composition, and the second composition comprises Mn, and the Mn is present in the second composition in an amount of about 0.01 to about 0.6 mole, specifically about 0.02 to about 0.5 mole, per mole of the second composition, is also specifically mentioned.

In an embodiment, the first and second compositions may each independently comprise a composition of Formula 1:

$$Li_a Q^1_y Q^2_z M^1 O_2 \qquad (1)$$

wherein $Q^1$ is Mg, Sr, Ca, Cu, Zn, or a combination thereof, $Q^2$ is Mn, Al, Mg, Ca, Sr, Ba, Zn, Ti, Zr, Cr, Mo, Fe, V, Si, Ga, B, or a combination thereof, $M^1$ is Ni and Co, $0.1 \leq a \leq 1.2$, $0 < y \leq 0.2$, and $0 \leq z \leq 0.6$, with the proviso that the concentration of cobalt in the second composition is greater that the concentration of cobalt in the first composition. An embodiment in which $Q^1$ consists of Mg, Sr, Ca, Cu, or Zn, and an embodiment wherein $Q^1$ is Mg, are each specifically mentioned. Also mentioned is an embodiment in which $Q^2$ comprises Mn, Al, Mg, Ca, B, or a combination thereof. An embodiment in which $Q^2$ consists of Mg, and another embodiment in which $Q^2$ consists of Mn, are each specifically mentioned. In Formula 1, a and y may be independently selected so long as Formula 1 is satisfied, and, a may satisfy $0.2 \leq a \leq 1.1$, specifically $0.3 \leq a \leq 1$, and y of Formula 1 may satisfy $0.01 < y \leq 0.15$, specifically $0.05 < y \leq 0.1$.

In an embodiment, the first and second compositions may each independently comprise a composition of Formula 2:

$$Li_a Ni_{(1-x-y)} Co_x M^2_y O_b \qquad (2)$$

wherein $M^2$ is Al, V, Ti, B, Zr, Mn, or a combination thereof, $0.1 \leq a \leq 1.3$, $0.01 \leq x \leq 0.5$, $0 < y \leq 0.2$, and $1.7 < b \leq 2.3$, provided that x in the second composition is greater than x in the first composition. In an embodiment $M^2$ is Al, V, Ti, B, Zr, or Mn. An embodiment in which $M^2$ is Al or B is specifically mentioned. In Formula 2, a, x, and y may be independently selected so long as Formula 2 is satisfied, and a of Formula 2 may satisfy $0.2 \leq a \leq 1.1$, specifically $0.3 \leq a \leq 1$, x of Formula 2 may satisfy $0.02 \leq x \leq 0.4$, specifically $0.04 \leq x \leq 0.3$, and y of Formula 2 may satisfy $0.01 < y \leq 0.15$, specifically $0.05 < y \leq 0.1$.

In an embodiment, the first and second compositions each independently comprise a composition of Formula 3:

$$Li_a Ni_{(1-x-y-z)} Co_x M^3_y Mn_z O_b \qquad (3)$$

wherein $M^3$ is Al, V, Ti, B, Zr, or a combination thereof, $0.1 \leq a \leq 1.3$, $0.01 \leq x \leq 0.5$, $0 < y \leq 0.1$, $0.1 \leq z \leq 0.6$, and $1.7 \leq b \leq 2.3$. In an embodiment, $M^3$ is Al, V, Ti, B, or Zr. An embodiment in which $M^3$ is Al or B is specifically mentioned. In Formula 3, a, x, y, z, and b may be independently selected so long as Formula 3 is satisfied, and a of Formula 3 may satisfy $0.2 \leq a \leq 1.1$, specifically $0.3 \leq a \leq 1$, x of Formula 3 may satisfy $0.02 \leq x \leq 0.4$, specifically $0.04 \leq x \leq 0.3$, y of Formula 3 may satisfy $0.01 < y \leq 0.09$, specifically $0.05 < y \leq 0.08$, z of Formula 3 may satisfy $0.15 \leq z \leq 0.5$, specifically $0.2 \leq z \leq 0.4$, and b of Formula 3 may satisfy $1.8 \leq b \leq 2.2$, specifically $1.9 \leq b \leq 2.1$.

In an embodiment, the first and second compositions may each independently comprise a composition of Formula 4:

$$Li_a Ni_{(1-x)} Co_x O_2 \qquad (4)$$

wherein $0.1 \leq a \leq 1.3$ and $0 < x < 0.2$. In an embodiment, a of Formula 4 may satisfy $0.2 \leq a \leq 1.1$, specifically $0.3 \leq a \leq 1$, and x of Formula 4 may satisfy $0.02 < x < 0.18$, specifically $0.04 < x < 0.16$. In another embodiment, the first composition, the second composition, or a combination thereof, comprises a composition of Formula 4 wherein $0.1 \leq a \leq 1.3$ and $0.2 < x < 0.5$. In an embodiment, x of Formula 4 may satisfy $0.25 < x < 0.45$, specifically $0.3 < x < 0.4$.

In an embodiment, the first composition comprises a composition of Formula 4 wherein $0 < x < 0.2$ and the second composition comprises a composition of Formula 4 wherein $0.2 < x < 0.5$.

As is further discussed above, in an embodiment a concentration of cobalt in the grain boundary is greater than a concentration of cobalt in the crystallite. A concentration of cobalt in the crystallite may be 0 to about 17 atomic percent, specifically about 0.25 to about 17 atomic percent, more specifically about 1 to about 15 atomic percent, or about 2 to about 13 atomic percent, based on a total atomic composition of the crystallite. Also, a concentration of cobalt in the grain boundary may be about 0.5 to about 32 atomic percent, specifically about 1 to about 30 atomic percent, more specifically about 2 to about 28 atomic percent, based on a total atomic composition of the grain boundary. The concentration of cobalt in the grain boundary may be about 0.01 to about 30 atomic percent, specifically about 0.1 to about 20 atomic percent, more specifically about 1 to about 15 atomic percent greater that a concentration of cobalt in the crystallite, based on an average composition of the secondary particle. The atomic concentration of cobalt in the grain boundary and in the crystallite may be determined by energy dispersive X-ray (EDX) analysis of a center of a grain boundary and a center of an adjacent crystallite for a thinly sliced (e.g., 100-150 nm thick) section of the secondary particle prepared by a sectioning technique such as focused ion beam milling, for example.

The secondary particle may be prepared by contacting a lithium compound, a cobalt compound, and a nickel compound to form a mixture; heat treating the mixture at about 30 to about 200° C. to form a dried mixture; heat treating the dried mixture at about 200 to about 500° C. for about 0.1 to about 5 hours; then heat treating at 600 to about 800° C. for about 0.1 to about 5 hours to manufacture the particle.

The lithium compound may comprise a lithium salt, such as lithium nitrate, lithium carbonate, lithium hydroxide, or a combination thereof. The cobalt compound may be a cobalt nitrate such as $Co(NO_3)_2 \cdot 6H_2O$, a cobalt chloride such as $CoCl_2 \cdot 6H_2O$, or cobalt isopropoxide, or a combination thereof. Also, the nickel compound may be a lithium nickel oxide comprising lithium in an amount of about 0.1 to about 1.3 moles, nickel in an amount of about 0.1 to about 0.79 mole, cobalt in an amount of about 0.01 to about 0.5 mole, and oxygen in an amount of about 1.7 to about 2.3 moles, each per mole of the lithium nickel oxide. In another embodiment, the lithium nickel oxide comprises nickel in an amount of about 0.91 to about 0.99 mole, per mole of the lithium nickel oxide. In an embodiment, the lithium nickel oxide comprises a composition of Formulas 1 to 4, or a combination thereof. The stoichiometric ratio of the lithium compound and the cobalt compound may be 0.0 to about 1.2, specifically about 0.1 to about 1, more specifically about 0.2 to about 0.8.

To form the mixture, the lithium compound, the cobalt compound, and the nickel compound may be contacted in a liquid, and the liquid evaporated to form a mixture. The liquid may comprise water, an alcohol such as ethanol, propanol, isopropanol, butanol, or isobutanol, an acetate such as methyl acetate, ethyl acetate, or butyl acetate, acetonitrile, a ketone such as acetone, a glycol such as ethylene glycol, hexylene glycol, diethylene glycol, or ethylene glycol monoethyl ether, xylene, or a halogenated hydrocarbon such as methylene dichloride, chloroform, carbon tetrachloride, or ethylene dichloride, or a combination thereof. Water is specifically mentioned. The mixture may then be heat treated at about 30 to about 200° C., specifically about 40 to about 180° C., more specifically about 50 to about 160° C. to form a dried mixture. The dried mixture may be heated at about 5 to about 20° C. per minute to about 200 to about 500° C., specifically about 250 to about 450° C., and heat treated at about 200 to about 500° C., specifically about 250 to about 450° C., for about 0.1 to about 5 hours, specifically about 1 to about 4 hours. The material may then be heated at about 5 to about 100° C. per minute to about 600 to about 900° C., specifically about 650 to about 850° C. for about 0.1 to about 10 hours, specifically about 1 to about 9 hours, to manufacture the secondary particle.

Optionally a layer 30, such as a passivation layer or a protective layer, may be disposed on an outer surface of the secondary particle to provide a coated secondary particle. The coating may fully or partially cover the secondary particle. The layer may be amorphous or crystalline. The layer may comprise an oxide, a phosphate, a pyrophosphate, a fluorophosphate, a carbonate, a fluoride, an oxyfluoride, or a combination thereof, of a metal such as Zr, Al, Ti, Al, B, or Si, or a combination thereof. An embodiment in which the layer comprises a borate, an aluminate, a silicate, a fluoroaluminate, or a combination thereof is specifically mentioned. In an embodiment the layer comprises a carbonate. In an embodiment, the layer comprises $ZrO_2$, $Al_2O_3$, $TiO_2$, $AlPO_4$, $AlF_3$, $B_2O_3$, $SiO_2$, $Li_2O$, $Li_2CO_3$, or a combination thereof. A layer comprising $AlPO_4$ or $Li_2CO_3$ is specifically mentioned. The layer may be disposed by any process or technique that does not adversely affect the desirable properties of the secondary particle. Representative methods include spray coating and immersion coating, for example.

Also disclosed is cathode for a lithium-ion battery comprising the secondary particle. The cathode comprises the secondary particle disclosed above as an active material, and may further comprise a conductive agent and a binder. The conductive agent may comprise any conductive agent that provides suitable properties and may be amorphous, crystalline, or a combination thereof. The conductive agent may comprise a carbon black, such as acetylene black or lamp black, a mesocarbon, graphite, carbon fiber, carbon nanotubes such as single wall carbon nanotubes or multi-wall carbon nanotubes, or a combination thereof. The binder may comprise any binder that provides suitable properties and may comprise polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example.

The cathode may be manufactured by combining the secondary particle, the conductive agent, and the binder in a suitable ratio, e.g., about 80 to about 98 weight percent of the secondary particle, about 2 to about 20 weight percent of the conductive agent, and about 2 to about 10 weight percent of the binder, based on a total weight of the secondary particle, the conductive agent, and the binder. The secondary particle, the conductive agent, and the binder may be suspended in a suitable solvent, such as N-methylpyrrolidinone, and disposed on a suitable substrate, such as aluminum foil, and dried in air.

Figure 2:
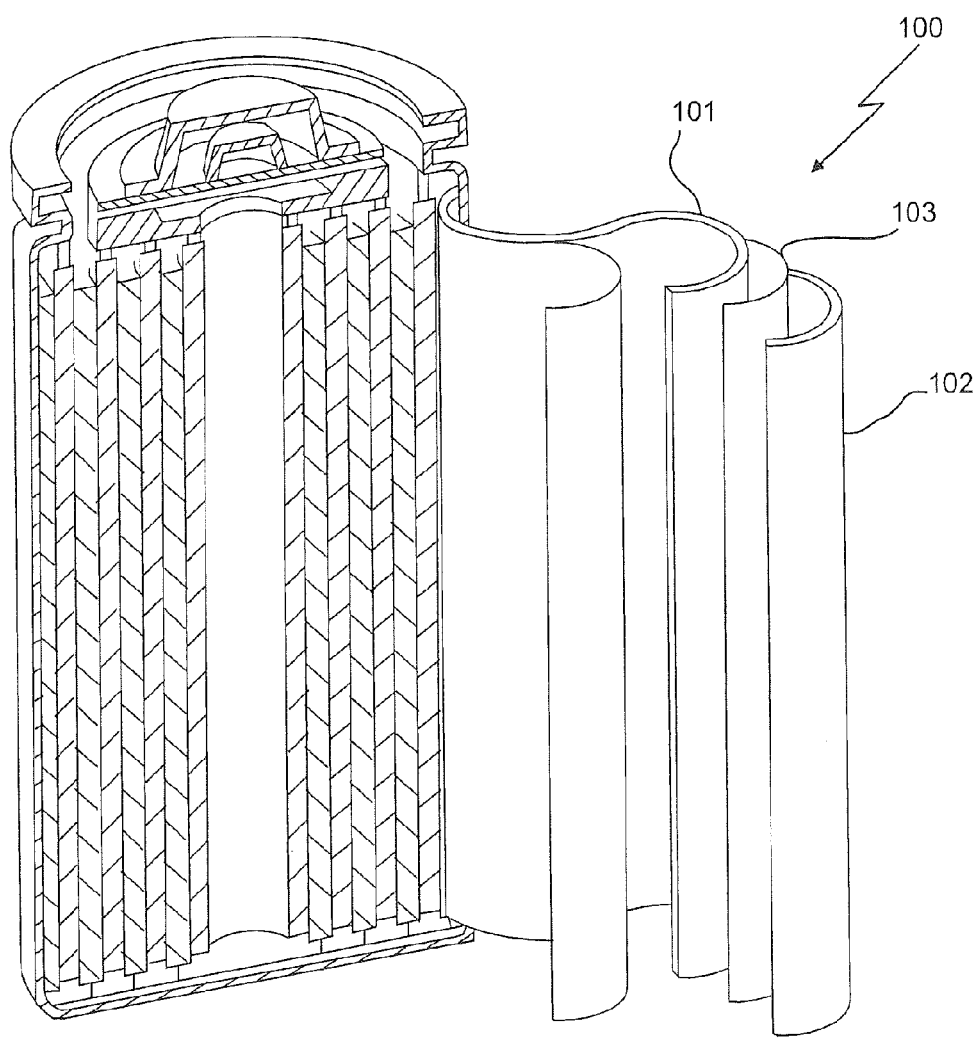
FIG. 2 is a schematic illustration of an embodiment of a battery.

Also disclosed is a battery comprising the cathode. The battery may be a lithium-ion battery, a lithium-polymer battery, or a lithium battery, for example. As shown in FIG. 2, the battery 100 may include a cathode 101; an anode 102; and a separator 103 interposed between the cathode 101 and the anode 102. The separator may be a microporous membrane, and may comprise a porous film comprising polypropylene, polyethylene, or a combination thereof, or may be a woven or non-woven material such a glass-fiber mat. The anode 102 may comprise a coating on a current collector. The coating may comprise a suitable carbon, such as graphite, coke, a hard carbon, or a mesocarbon such as a mesocarbon microbead, for example. The current collector may be copper foil, for example.

The battery also comprises an electrolyte which contacts the positive electrode 101, the negative electrode 102, and the separator 103. The electrolyte may comprise an organic solvent and a lithium salt. The organic solvent may be a linear or cyclic carbonate. Representative organic solvents include ethylene carbonate, propylene carbonate, butylene carbonate, trifluoropropylene carbonate, γ-butyrolactone, sulfolane, 1,2-dimethoxyethane, 1,2-diethoxyethane, tetrahydrofuran, 3-methyl-1,3-dioxolane, methyl acetate, ethyl acetate, methylpropionate, ethylpropionate, dimethyl carbonate, diethyl carbonate, ethyl methyl carbonate, dipropyl carbonate, methylpropyl carbonate, or a combination thereof. In another embodiment the electrolyte is a polymer electrolyte.

Representative lithium salts include $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiC(CF_3SO_2)_3$, $LiC_4F_9SO_3$, and $LiAlCl_4$. The lithium salt may be dissolved in the organic solvent. A combination comprising at least one of the foregoing can be used. The concentration of the lithium salt can be 0.1 to 2.0M in the electrolyte.

The battery may have any suitable configuration or shape, and may be cylindrical or prismatic.

While not wanting to be bound by theory, it is understood that the disclosed secondary particle is a dense polycrystalline agglomerate of submicron-sized primary crystallites. It has been shown that in polycrystalline materials having the layered $\alpha$-$NaFeO_2$-type structure, electrochemical cycling induces the layers of the transition metal atoms at the grain boundaries (e.g., edges of the crystallites) to reorganize into a NiO-type rock salt structure and/or to be reduced in oxidation state. These transformations are also associated with the appearance of cracks between adjacent crystallites. While not wanting to be bound by theory, it is understood that the resulting NiO-type phase and cracks in the grain boundaries between crystallites significantly degrade the electrochemical performance of these materials. It is also understood that whereas Ni atoms at the grain boundaries undergo reduction in oxidation state as part of these transformations, Co atoms in the grain boundaries do not, suggesting that it is primarily the Ni atoms that are mobile and drive the undesirable structural rearrangements in the grain boundaries.

The above observations indicate that Co substitution in lithium nickel oxides having the layered $\alpha$-$NaFeO_2$-type structure enhances electrochemical performance by stabilizing the grain boundaries of the secondary particle. Therefore Co-substituted lithium nickel oxides with Co preferentially disposed at the grain boundaries (and relatively less Co in the crystallites) can provide improved cycling stability with less overall cobalt content than a lithium nickel oxide with uniformly distributed Co, or Co disposed in a location other than in the grain boundaries. Materials with Co-enriched grain boundaries can thus provide improved stability, such as improved capacity, cycle life, coulombic efficiency, rate capability, and safety, while minimizing the detrimental impacts of Co substitution on capacity, rate capability, and cost by providing Co where it is most effective, e.g., in the grain boundaries, and avoiding use of Co where it is less effective, e.g., in the crystallites.

The grain boundary of the secondary particle disclosed herein is distinguished from a "shell" of a "core/shell" material or a "coating" of a coated particle in which a lithium nickel oxide secondary particle is coated with a Co-containing material, such as $LiCoO_2$, to provide a $LiCoO_2$ coated $LiNi_{(1-x)}Co_xO_2$ core/shell or coated material, for example. In the core/shell material, the secondary particle is coated with the Co-containing material to provide cobalt on the outer surface of the secondary particle, ostensibly to reduce the interaction between the lithium nickel oxide secondary particle and an electrolyte in a battery.

In an embodiment disclosed is a particle, comprising: a plurality of crystallites comprising a first composition having a layered $\alpha$-$NaFeO_2$-type structure and comprising lithium in an amount of about 0.1 to about 1.3 moles, per mole of the first composition, nickel in an amount of about 0.1 to about 0.79 mole, per mole of the first composition, cobalt in an amount of 0 to about 0.5 mole, per mole of the first composition, and oxygen in an amount of about 1.7 to about 2.3 moles, per mole of the first composition; and a grain boundary between adjacent crystallites of the plurality of crystallites and comprising a second composition having the layered $\alpha$-$NaFeO_2$-type structure, a cubic structure, or a combination thereof, wherein a concentration of cobalt in the grain boundary is greater than a concentration of cobalt in the crystallites.

In various embodiments, (i) the grain boundary is substantially rectilinear in cross-section; and/or (ii) a direction of a surface of the grain boundary is different than a direction of a tangent of a nearest outer surface of the particle; and/or (iii) the particle comprises a first grain boundary and a second grain boundary, wherein the first grain boundary and the second grain boundary are each directly on a crystallite of the plurality of crystallites, and wherein the first grain boundary and second grain boundary intersect at an angle determined by a crystal structure of the first composition; and/or (iv) the grain boundary has a length of about 50 to about 1000 nanometers, wherein the length is parallel to a surface of an adjacent crystallite; and/or (v) the grain boundary has a thickness of about 1 to about 200 nanometers, wherein the thickness is perpendicular to the crystallite surface; and/or (vi) the particle has an average grain boundary length of about 50 to about 1000 nanometers; and/or (vii) the particle has an average grain boundary thickness of about 5 to about 200 nanometers; and/or (viii) the second composition comprises lithium in an amount of about 0.1 to about 1.3 moles, per mole of the second composition, nickel in an amount of about 0.1 to about 0.95 mole, per mole of the second composition, cobalt in an amount of about 0.02 to about 0.99 mole, per mole of the second composition, and oxygen in an amount of about 1.7 to about 2.3 moles, per mole of the second composition; and/or (ix) the second composition comprises nickel in an amount of about 0.1 to about 0.79 mole, per mole of the second composition, and cobalt in an amount of about 0.02 to about 0.5 mole, per mole of the second composition; and/or (x) the first composition may further comprise an additional metal, wherein the additional metal is present in an amount of about 0.01 to about 0.9 mole, per mole of the first composition; and the second composition further comprises a second metal, wherein the second metal is present in an amount of about 0.01 to about 0.9 mole, per mole of the second composition; and/or (xi) the additional metal is present in an amount of about 0.01 to about 0.2 mole, per mole of the first composition, and the second metal is present in an amount of about 0.01 to about 0.2 mole, per mole of the second composition; and/or (xii) the additional metal and the second metal each independently comprise Mg, Sr, Ca, Cu, Zn, Mn, Al, V, Ba, Zr, Ti, Cr, Fe, Mo, B, or a combination thereof; and/or (xiii) the additional metal and the second metal are a same metal, and each consist of Mg, Al, V, Ti, B, Zr, or Mn; and/or (xiv) the additional metal and the second metal are each Mg; and/or (xv) the first composition comprises Mn, and the Mn is present in the first composition in an amount of about 0.01 to about 0.6 mole, per mole of the first composition, and the second composition comprises Mn, and the Mn is present in the second composition in an amount of about 0.01 to about 0.6 mole, per mole of the second composition; and/or (xvi) the first and second compositions each independently comprise a composition of Formula 1:

$$Li_aQ^1_yQ^2_zM^1O_2 \quad (1)$$

wherein $Q^1$ is Mg, Sr, Ca, Cu, Zn, or a combination thereof, $Q^2$ is Mn, Al, Mg, Ca, Sr, Ba, Zn, Ti, Zr, Cr, Mo, Fe, V, Si, Ga, or B, or a combination thereof, $M^1$ is Ni and Co, $0.1 \le a \le 1.2$, $0 < y \le 0.2$, and $0 \le z \le 0.6$; and/or (xvii) the first and second compositions each independently comprise a composition of Formula 2

$$Li_a Ni_{(1-x-y)} Co_x M^2_y O_b \qquad (2)$$

wherein $M^2$ is Al, V, Ti, B, Zr, Mn, or a combination thereof, $0.1 \le a \le 1.3$, $0.01 \le x \le 0.5$, $0 < y \le 0.2$, and $1.7 \le b \le 2.3$; and/or (xviii) the first and second compositions each independently comprise a composition of Formula 3:

$$Li_a Ni_{(1-x-y-z)} Co_x M^3_y Mn_z O_b \qquad (3)$$

wherein $M^3$ is Al, V, Ti, B, Zr, or a combination thereof, $0.1 \le a \le 1.3$, $0.01 \le x \le 0.5$, $0 < y \le 0.1$, $0.1 \le z \le 0.6$, and $1.7 \le b \le 2.3$; and/or (xix) the first and second compositions each independently comprise a composition of Formula 4:

$$Li_a Ni_{(1-x)} Co_x O_2 \qquad (4)$$

wherein $0.1 \le a \le 1.3$, and $0 < x < 0.2$ or $0.2 < x < 0.5$; and/or (xx) the first composition comprises a composition of Formula 4 wherein $0 < x < 0.2$, and the second composition comprises a composition of Formula 4 wherein $0.2 < x < 0.5$; and/or (xxi) a concentration of cobalt in the crystallites is about 0.25 to about 17 atomic percent, and a concentration of cobalt in the grain boundary is about 0.5 to about 32 atomic percent, each based on a total atomic composition of the particle; and/or (xxii) further comprising a layer on a surface of the particle, wherein the layer comprises an oxide, a phosphate, a pyrophosphate, a fluorophosphate, a carbonate, a fluoride, an oxyfluoride, or a combination thereof, of Zr, Al, Ti, Al, B, or Si, or a combination thereof; and/or (xxiii) the layer comprises $ZrO_2$, $Al_2O_3$, $TiO_2$, $AlPO_4$, $AlF_3$, $B_2O_3$, $SiO_2$, $Li_2O$, $Li_2CO_3$, or a combination thereof; and/or (xxiv) the layer comprises a borate, an aluminate, a silicate, a fluoroaluminate, or a combination thereof.

Also disclosed is a particle, comprising: a plurality of crystallites comprising a first composition having a layered $\alpha$-NaFeO$_2$-type structure and comprising lithium in an amount of about 0.1 to about 1.3 moles, per mole of the first composition, nickel in an amount of about 0.91 to about 0.99 mole, per mole of the first composition, cobalt in an amount of 0 to about 0.5 mole, per mole of the first composition, and oxygen in an amount of about 1.7 to about 2.3 moles, per mole of the first composition; and a grain boundary between adjacent crystallites of the plurality of crystallites and comprising a second composition having a layered $\alpha$-NaFeO$_2$-type structure, a cubic structure, or a combination thereof, wherein a concentration of cobalt in the grain boundary is greater than a concentration of cobalt in the crystallites.

Also disclosed is an electrode for a lithium-ion battery, the electrode comprising the particle, and a lithium-ion battery comprising the particle.

Also disclosed is a method of manufacturing a particle, the method comprising: combining a lithium compound, a cobalt compound, and a nickel compound to form a mixture; heat treating the mixture at about 30 to about 200° C. to form a dried mixture; heat treating the dried mixture at about 200 to about 500° C. for about 0.1 to about 5 hours; then heat treating at 600 to about 900° C. for about 0.1 to about 10 hours to manufacture the particle, wherein the particle comprises a plurality of crystallites comprising a first composition having a layered $\alpha$-NaFeO$_2$-type structure and comprising Li, Ni, Co, and O, wherein the Li is present in an amount of about 0.1 to about 1.3 moles, per mole of the first composition, nickel is present in an amount of about 0.1 to about 0.79 mole or about 0.91 to about 0.99 mole, per mole of the first composition, cobalt is present in an amount of 0 to about 0.5 mole, per mole of the first composition, and oxygen is present in an amount of about 1.7 to about 2.3 moles, per mole of the first composition; and a grain boundary between adjacent crystallites of the plurality of crystallites and comprising a second composition having a layered $\alpha$-NaFeO$_2$-type structure, a cubic structure, or a combination thereof, wherein a concentration of cobalt in the grain boundary is greater than a concentration of cobalt in the crystallites.

The disclosed embodiment is further illustrated in the following Examples.

EXAMPLES

Example 1

Preparation of $Li_{1.05}Mg_{0.025}Ni_{0.92}Co_{0.08}O_{2.05}$

A material having the composition $Li_{1.05}Mg_{0.025}Ni_{0.92}Co_{0.08}O_{2.05}$ was prepared dry mixing 242.9 g Li(OH)$_2$ (anhydrous fine powder available from Sigma-Aldrich, Inc., St. Louis, Mo.), 14.8 g Mg(OH)$_2$ (fine powder available from Alfa Aesar, Ward Hill, Mass.), and 35.0 g LiNO$_3$ (crystals available from Alfa Aesar, Ward Hill, Mass.). To the mixture of Li(OH)$_2$, Mg(OH)$_2$, and LiNO$_3$ was added 940.3 g Ni$_{0.92}$Co$_{0.08}$(OH)$_2$ (available from OM Group, Inc.) in a 1 liter jar. The compounds were mixed by shaking the jar.

The mixed compounds were placed in an alumina crucible and sintered. Sintering was performed by heating at a rate of about 5° C. per minute to about 450° C., and held at about 450° C. for about two hours. The temperature was then raised at about 2° C. per minute to about 700° C., and held for about six hours. The sample was then allowed to cool naturally to room temperature. The cooled sample was ground for about five minutes to break up any agglomerates to provide $Li_{1.05}Mg_{0.025}Ni_{0.92}Co_{0.08}O_{2.05}$.

Example 2

$Li_{1.01}Mg_{0.024}Ni_{0.88}Co_{0.12}O_{2.03}$ with Co-Enriched Grain Boundaries 0.3 grams (g) of LiNO$_3$ and 117.4 g of Co(NO$_3$)$_2$.6H$_2$O were dissolved in 1000 g of H$_2$O heated to 60° C., and 1000 g of the $Li_{1.05}Mg_{0.025}Ni_{0.92}Co_{0.08}O_{2.05}$ of Example 1 was added thereto and the resulting slurry was stirred for 30 minutes. The slurry was then spray-dried to yield a powder. The resulting powder was placed in an alumina crucible and heated at a rate of about 5° C. per minute to about 450° C., and held at about 450° C. for about one hour. The temperature was then raised at about 2° C. per minute to about 700° C., and held for about two hours. The sample was then allowed to cool naturally to room temperature to provide a material having the overall composition $Li_{1.01}Mg_{0.024}Ni_{0.88}Co_{0.12}O_{2.03}$. X-ray diffraction (XRD) confirmed the material as having the layered $\alpha$-NaFeO$_2$-type structure with lattice parameters a=2.872 Å and c=14.192 Å.

A thin (approximately 100 to 150 nanometer, nm) section of a secondary particle was prepared by focused ion beam milling for scanning transmission electron microscopy (STEM) and energy dispersive X-ray (EDX) analysis.

Figure 3:
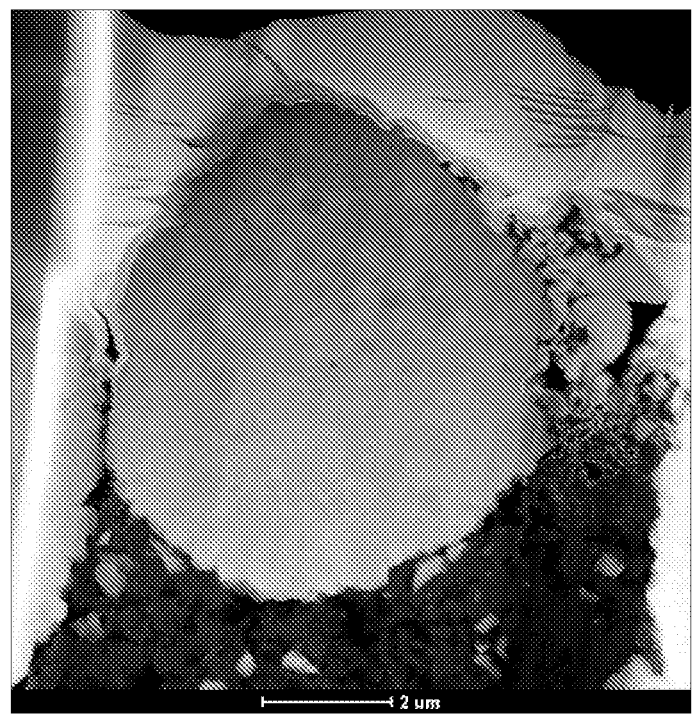
FIG. 3 is a scanning electron micrograph (SEM) of a thin cross-section of a secondary particle prepared in Example 2.

FIG. 3 is a low-resolution STEM image of secondary particle having a diameter of about 7 μm. The secondary particle is comprised of densely agglomerated primary crystallites.

Figure 4:
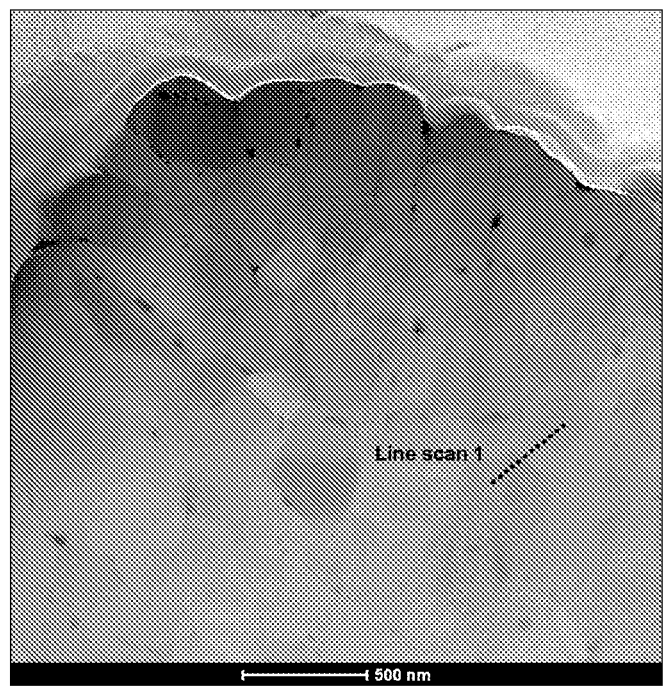
FIG. 4 is an enlarged view of the secondary particle of FIG. 3 showing the location of EDX spot analyses.
Figure 5:
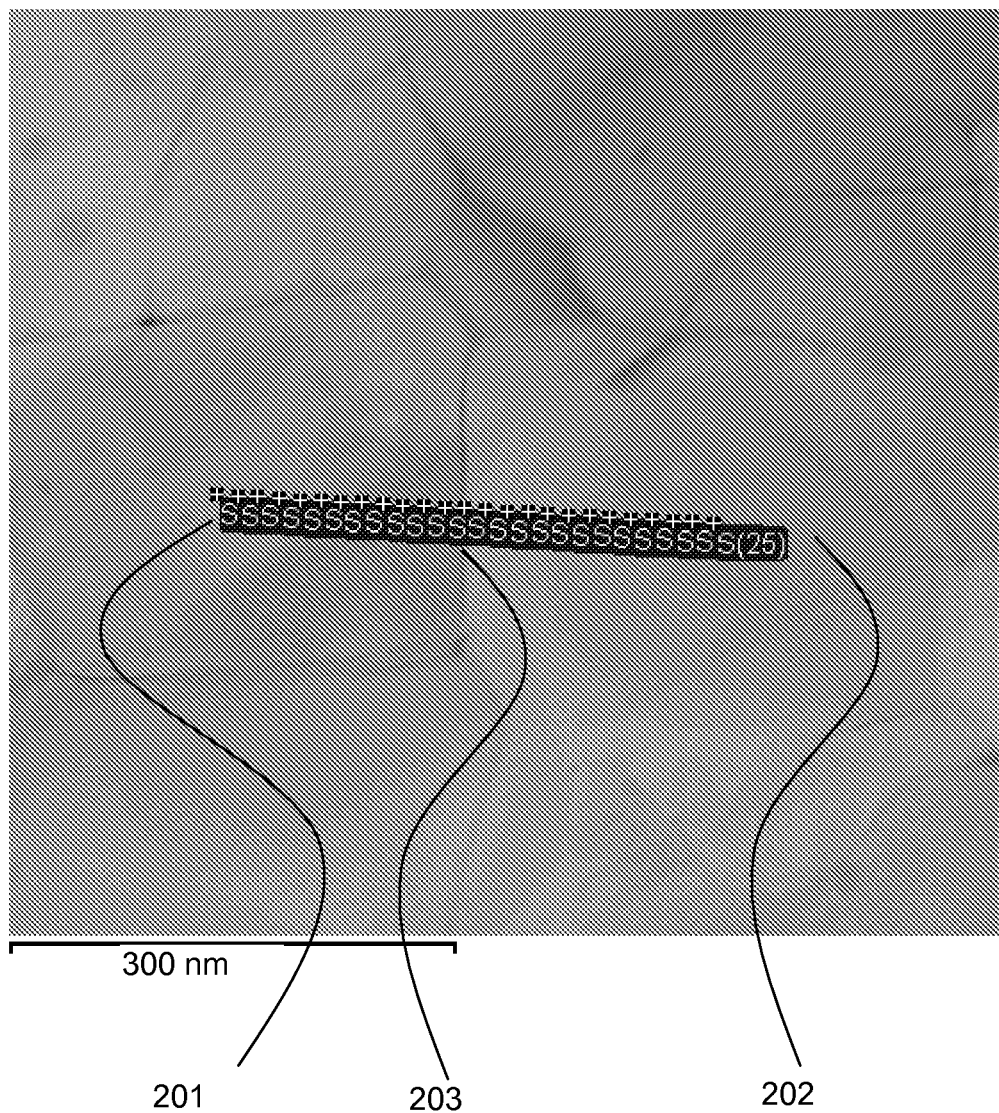
FIG. 5 is a further enlarged view of the secondary particle of FIG. 3 showing the location of EDX spot analyses.
Figure 6:
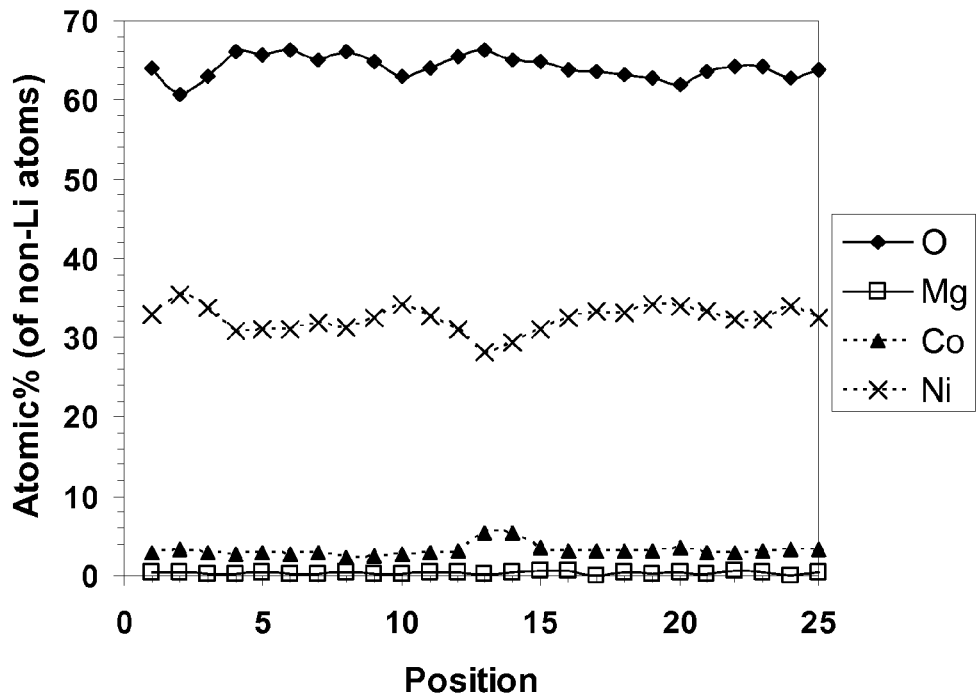
FIG. 6 is a graph of atomic percent of non-lithium atoms versus position showing the concentration of O, Mg, Co, and Ni for each of the EDX spot analyses indicated in FIG. 5.
Figure 7:
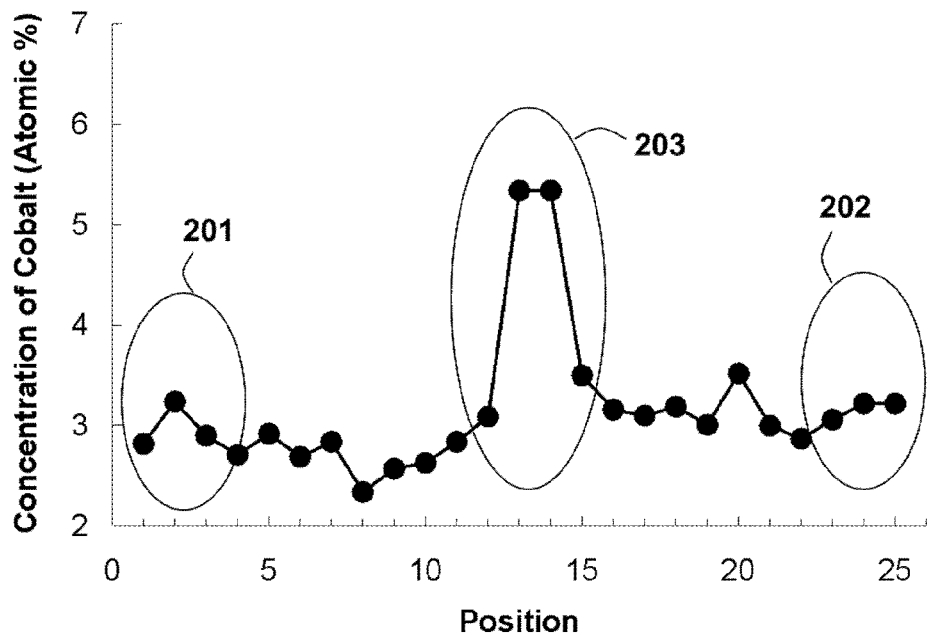
FIG. 7 is a graph of the concentration of cobalt (atomic percent) versus position for each of the EDX spot analyses indicated in FIG. 5.

FIG. 4 is a higher resolution STEM image of the particle shown in FIG. 3, and FIG. 5 an enlarged view of a portion of FIG. 4. Indicated in FIGS. 4 and 5 is the location of the EDX spot analyses, the results of which are shown in FIGS. 6 and 7. A total of 25 spots (each indicated with an "s" and arranged in a line), were analyzed. The line began at position 1 the center of a first crystallite 201, traversed a grain boundary 203, and ended at position 25 at the center of an adjacent second crystallite 202.

FIG. 6 is a graph of concentration (arbitrary units) versus position showing the concentration of the elements O, Mg, Co, and Ni for each spot of the EDX analysis. The results of FIG. 6 show that a concentration of cobalt in the grain boundary 203 is greater than a concentration of cobalt in either of the first and second crystallites 201 and 202.

FIG. 7 is a graph of the concentration of cobalt (as a percentage of non-Lithium atoms) versus position for each spot of the EDX analysis. FIG. 7 also shows that the concentration of cobalt in the grain boundary 203 is greater than the concentration of cobalt in either of the first and second crystallites 201 and 202.

Example 3

$Li_{1.05}Mg_{0.025}Ni_{0.88}Co_{0.12}O_{2.05}$ with Uniform Co Distribution

A material having the overall composition $Li_{1.05}Mg_{0.025}Ni_{0.88}Co_{0.12}O_{2.05}$ was prepared using the same method as provided in Example 1, except that 940.3 g of $Ni_{0.88}Co_{0.12}(OH)_2$ was used in place of $Ni_{0.92}Co_{0.08}(OH)_2$, thus yielding a material having substantially the same overall composition as that of example 2, but with Co uniformly distributed as opposed to having the Co enriched grain boundaries of example 2. XRD confirmed the material as having the layered α-NaFeO$_2$-type structure with lattice parameters a=2.869 Å and c=14.182 Å.

Example 4

Electrochemical Analyses of Examples 2 and 3

The materials of Examples 2 and 3 were each blended with PVdF (Kureha KF-1120) and carbon (Denka black) in N-methylpyrrolidinone to form a slurry, and each slurry coated on an aluminum foil current collector. Cathodes were punched from the coated aluminum foil and were assembled into half cells with lithium foil, a glass fiber separator (Whatman 934-AH) and an electrolyte of 1 M LiPF$_6$ in 1/1/1 (vol.) EC/DMC/EMC with 1 wt. % VC (Kishida Chemical) in a 2025 coin cell. The capacity of each cell was determined by calculation from the electrode weight, assuming a capacity of 200 mAh/g cathode material. The cells were then charged to 4.3 V at C/20, and discharged at rates from C/20 to 5C. With respect to charge or discharge rates, C refers to the C-rate, which is the rate to charge or discharge the cell in one hour. The results of the half-cell analysis are shown in Table 1.

TABLE 1

| | Half Cell results | | | |
|---|---|---|---|---|
| | Discharge Capacity (mAh/g) | | | Ratio of |
| Cathode Type | C/20 | C/5 | 5 C | 5 C to C/5 |
| Example 2 | 214 | 201 | 168 | 84% |
| Example 3 | 207 | 196 | 144 | 73% |

As shown in Table 1, the material of Example 2, in which a concentration of cobalt in grain boundaries was greater than in the crystallites, provided higher capacity at all discharge rates evaluated, and a higher 5C to C/5 ratio, than the material of Example 3, which had a uniform cobalt content.

Figure 8:
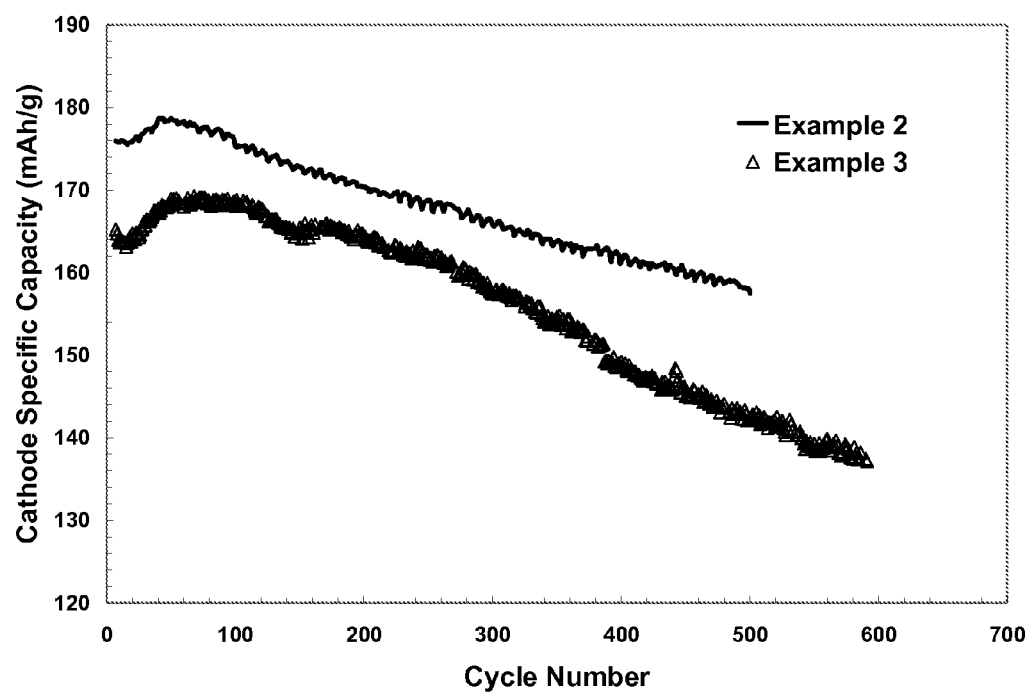
FIG. 8 is a graph of cathode specific capacity (milliampere hours per gram) versus cycle number and shows cycling capacity results for lithium-ion cells assembled with the cathode materials of Example 2 and Example 3.

Cathodes of the example 2 and 3 materials were also assembled in lithium-ion coin cells (size 2025) opposite graphitic carbon anodes (MCMB 25-28, Osaka Gas) with a microporous polyolefin separator (Celgard 2325) and electrolyte of 1 M LiPF$_6$ in 1/1/1 (vol.) EC/DMC/EMC with 1 wt. % VC (Kishida Chemical). These lithium-ion cells underwent extended 1C charge, 1C discharge cycling between 4.2 V and 2.75 V. FIG. 8 graphs the results of this 1C/1C cycling, showing that the material of example 2 having Co-enriched grain boundaries obtains higher capacity and higher cycling capacity retention than does the material of example 3 having the same overall Co content as the material of example 2, but with the Co uniformly distributed.

Example 5

Preparation of $Li_{1.05}Mg_{0.025}NiO_{2.05}$

A material having the composition $Li_{1.05}Mg_{0.025}NiO_{2.05}$ was prepared using the same method as provided in Example 1, except that 940.3 g of Ni(OH)$_2$ (#543 high density spherical powder available from OM Group, Inc., Cleveland, Ohio) was used in place of $Ni_{0.92}Co_{0.08}(OH)_2$.

Example 6

$Li_{1.01}Mg_{0.023}Ni_{0.93}Co_{0.07}O_{2.03}$ with Co-Enriched Grain Boundaries A material having the overall composition $Li_{1.01}Mg_{0.023}Ni_{0.93}Co_{0.07}O_{2.03}$ was prepared using the same method as provided in Example 2, except that 28.4 g of LiNO$_3$, 234.8 g Co(NO$_3$)$_2$.6H$_2$O, and 1000 g of the $Li_{1.05}Mg_{0.025}NiO_{2.05}$ of Example 5 were used. XRD confirmed the material as having the layered α-NaFeO$_2$-type structure with lattice parameters a=2.876 Å and c=14.200 Å. A particle of the material was sectioned by focused ion beam milling and was analyzed by STEM with EDX.

Figure 9:
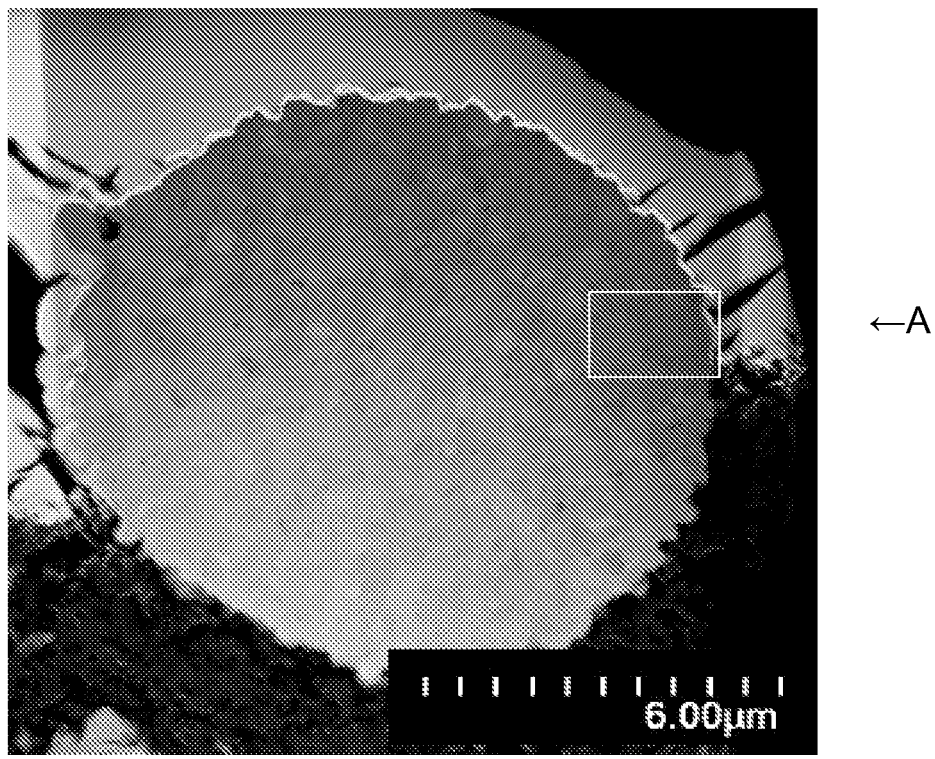
FIG. 9 is a scanning transmission electron micrograph (STEM) of a thin cross-section of a secondary particle prepared in Example 6.

Shown in FIG. 9 is a STEM image of a particle of the $Li_{1.01}Mg_{0.023}Ni_{0.93}Co_{0.07}O_{2.03}$. The area A in FIG. 9 indicates the area analyzed by high resolution STEM with energy dispersive X-ray analysis, the results of which are shown in FIGS. 10-13.

Figure 10:
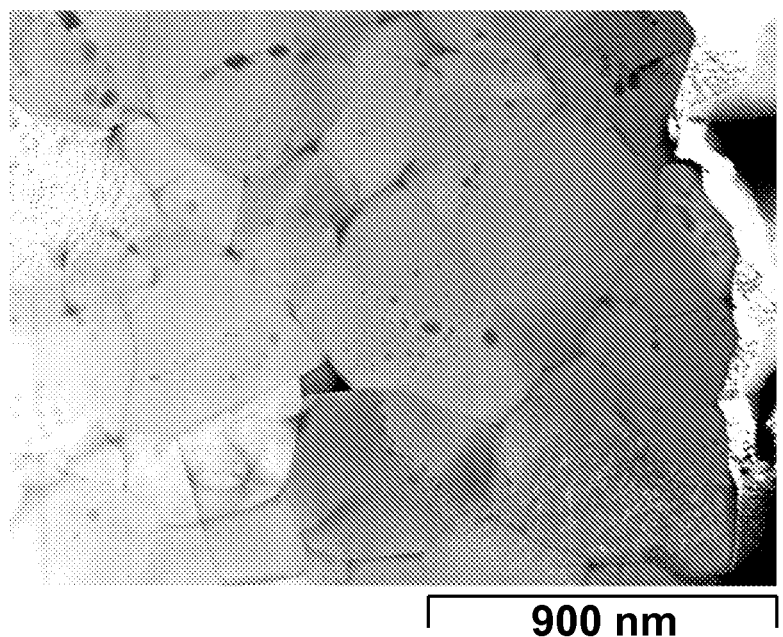
FIG. 10 is an enlarged view of area A indicated in FIG. 9.

FIG. 10 is a high-resolution STEM image of area A of the particle shown in FIG. 9. The image of FIG. 10 shows crystallites and grain boundaries between the crystallites.

Figure 11:
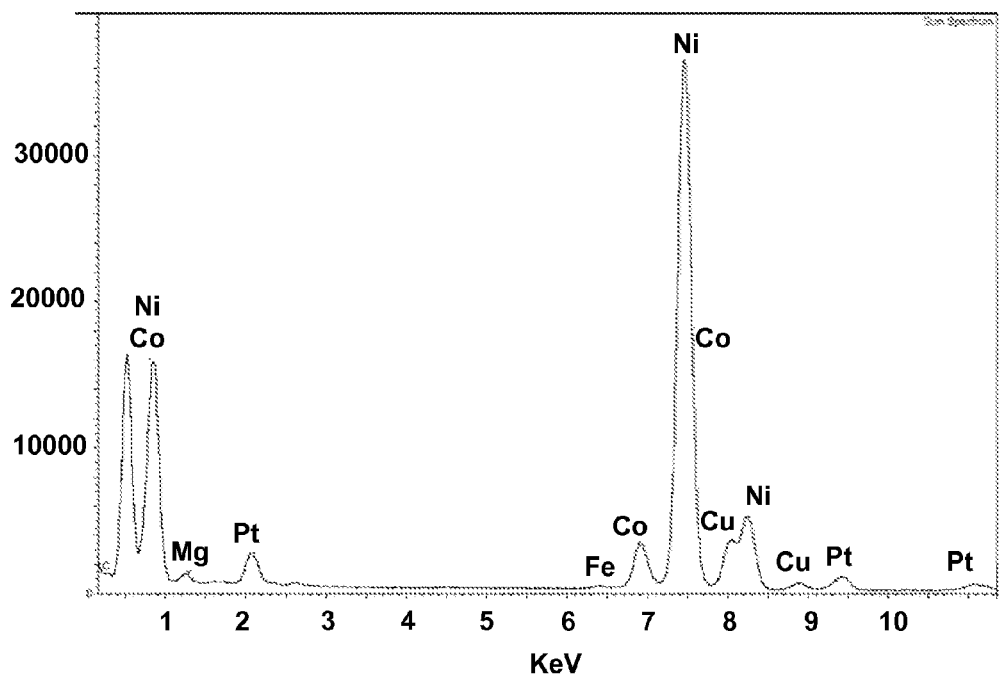
FIG. 11 is a graph of intensity (counts) versus energy (kiloelectron volts, keV) showing the results of energy dispersive X-ray (EDX) analysis of area A indicated in FIG. 9.

FIG. 11 is an energy dispersive X-ray (EDX) spectrum of the area shown in FIG. 10, showing the presence of cobalt and nickel. The overall cobalt to nickel ratio, determined by integrating the area of the cobalt and nickel peaks in the broad-area EDX spectrum, respectively, is 0.079.

Figure 12:
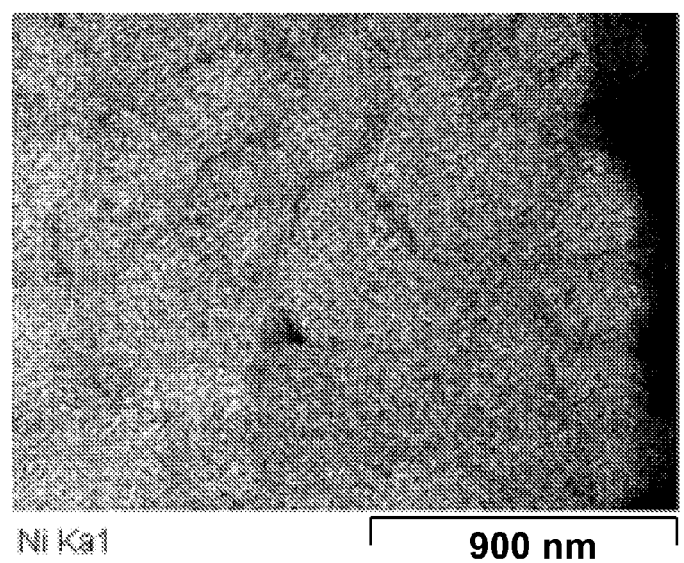
FIG. 12 is a Ni EDX map of area A indicated in FIG. 9.
Figure 13:
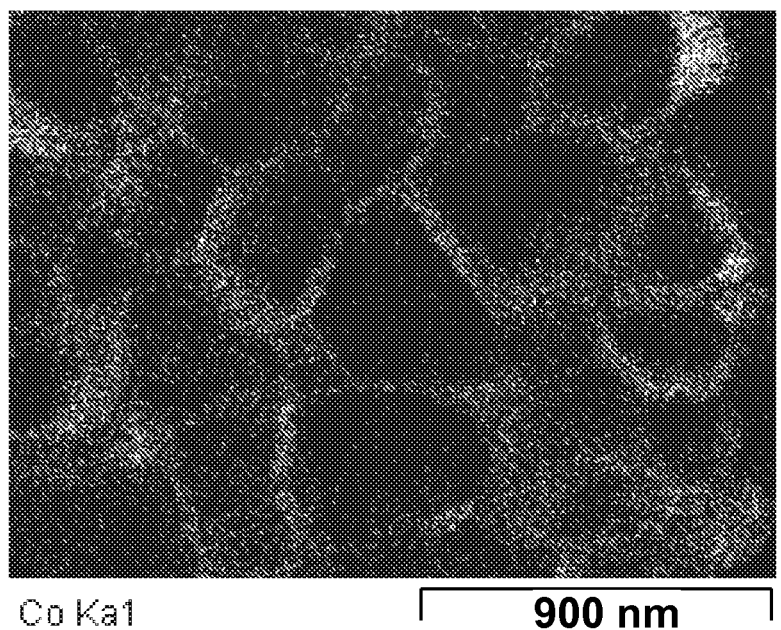
FIG. 13 is a Co EDX map of area A indicated in FIG. 9.

FIGS. 12 and 13 are, respectively, cobalt and nickel high-resolution EDX maps of the area shown in FIG. 10. FIG. 12 shows that nickel is uniformly distributed and is present in the crystallites and in the grain boundaries. FIG. 13 shows that the cobalt is concentrated at the grain boundaries. An average thickness of the grain boundaries in FIG. 13 is about 100 nm, and the thickness of the grain boundaries range from 50 nm to 150 nm.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the scope thereof. Therefore, it is intended that this disclosure not be limited to the particular embodiments disclosed as the best mode contemplated for carrying out this disclosure. It should also be understood that the embodiments disclosed herein should be considered in a descriptive sense only and not for purposes of limitation. Descriptions of features or aspects of each embodiment should be considered as available for other similar features or aspects of other embodiments.

What is claimed is:

1. A particle, comprising:
a plurality of crystallites comprising a first composition having a layered α-NaFeO₂-type structure and comprising
lithium in an amount of about 0.1 to about 1.3 moles, per mole of the first composition,
nickel in an amount of about 0.1 to about 0.79 mole, per mole of the first composition,
cobalt in an amount of 0 to about 0.5 mole, per mole of the first composition, and
oxygen; and
a grain boundary between adjacent crystallites of the plurality of crystallites and comprising a second composition having the layered α-NaFeO₂-type structure, a cubic structure, or a combination thereof,
wherein a concentration of cobalt in the grain boundary is greater than a concentration of cobalt in the crystallites.

2. The particle of claim 1, wherein the grain boundary is substantially rectilinear in cross-section.

3. The particle of claim 1, wherein a direction of a surface of the grain boundary is different than a direction of a tangent of a nearest outer surface of the particle.

4. The particle of claim 1, wherein the particle comprises a first grain boundary and a second grain boundary, wherein the first grain boundary and the second grain boundary are each directly on a same crystallite of the plurality of crystallites, and wherein the first grain boundary and second grain boundary intersect at an angle determined by a crystal structure of the first composition.

5. The particle of claim 1,
having an average grain boundary length of about 50 to about 1000 nanometers,
having an average grain boundary thickness of about 1 to about 200 nanometers,
wherein the grain boundary has a length of about 50 to about 1000 nanometers, wherein the length is parallel to a surface of an adjacent crystallite, and
wherein the grain boundary has a thickness of about 1 to about 200 nanometers, wherein the thickness is perpendicular to the crystallite surface.

6. The particle of claim 1, wherein
the second composition comprises
lithium in an amount of about 0.1 to about 1.3 moles, per mole of the second composition,
nickel in an amount of about 0.1 to about 0.95 mole, per mole of the second composition,
cobalt in an amount of about 0.02 to about 0.99 mole, per mole of the second composition, and
oxygen in an amount of about 1.7 to about 2.3 moles, per mole of the second composition.

7. The particle of claim 1, wherein
the first composition may further comprise an additional metal, wherein the additional metal of the first composition is present in an amount of about 0.01 to about 0.9 mole, per mole of the first composition;
the second composition further comprises an additional metal, wherein the additional metal of the second composition is present in an amount of about 0.01 to about 0.9 mole, per mole of the second composition; and
the additional metal of the first and second compositions each independently comprise Mg, Sr, Ca, Cu, Zn, Mn, Al, V, Ba, Zr, Ti, Cr, Fe, Mo, B, or a combination thereof.

8. The particle of claim 1, wherein
the first composition comprises Mn, and the Mn is present in the first composition in an amount of about 0.01 to about 0.6 mole, per mole of the first composition, and
the second composition comprises Mn, and the Mn is present in the second composition in an amount of about 0.01 to about 0.6 mole, per mole of the second composition.

9. The particle of claim 1, wherein
the first and second compositions each independently comprise a composition of Formula 1:

$$Li_a Q^1_y Q^2_z M^1 O_2 \quad (1)$$

wherein Q¹ is Mg, Sr, Ca, Cu, Zn, or a combination thereof, Q² is Mn, Al, Mg, Ca, Sr, Ba, Zn, Ti, Zr, Cr, Mo, Fe, V, Si, Ga, or B, or a combination thereof, M¹ is Ni and Co, 0.1≤a≤1.2, 0<y≤0.2, and 0≤z≤0.6; or
the first and second compositions each independently comprise a composition of Formula 2

$$Li_a Ni_{(1-x-y)} Co_x M^2_y O_b \quad (2)$$

wherein M² is Al, V, Ti, B, Zr, Mn, or a combination thereof, 0.1≤a≤1.3, 0.01≤x≤0.5, 0<y≤0.2, and 1.7≤b≤2.3; or
the first and second compositions each independently comprise a composition of Formula 3:

$$Li_a Ni_{(1-x-y-z)} Co_x M^3_y Mn_z O_b \quad (3)$$

wherein M³ is Al, V, Ti, B, Zr, or a combination thereof, 0.1≤a≤1.3, 0.01≤x≤0.5, 0<y≤0.1, 0.1≤z≤0.6, and 1.7≤b≤2.3; or
the first and second compositions each independently comprise a composition of Formula 4:

$$Li_a Ni_{(1-x)} Co_x O_2 \quad (4)$$

wherein 0.1≤a≤1.3 and 0<x<0.2 or 0.2<x<0.5.

10. The particle of claim 1,
wherein the first composition comprises a composition of Formula 4 wherein 0<x<0.2, and the second composition comprises a composition of Formula 4 wherein 0.2<x<0.5.

11. The particle of claim 1, wherein
a concentration of cobalt in the crystallites is about 0.25 to about 17 atomic percent, and
a concentration of cobalt in the grain boundary is about 0.5 to about 32 atomic percent, each based on a total atomic composition of the particle.

12. The particle of claim 1, further comprising a layer on a surface of the particle, wherein the layer comprises an oxide, a phosphate, a pyrophosphate, a fluorophosphate, a carbonate, a fluoride, an oxyfluoride, or a combination thereof, of Zr, Al, Ti, Al B, or Si, or a combination thereof.

13. A particle, comprising:
a plurality of crystallites comprising a first composition having a layered α-NaFeO₂-type structure and comprising
lithium in an amount of about 0.1 to about 1.3 moles, per mole of the first composition, nickel in an amount of about 0.91 to about 0.99 mole, per mole of the first composition, cobalt in an amount of 0 to about 0.5 mole, per mole of the first composition, and oxygen in an amount of about 1.7 to about 2.3 moles, per mole of the first composition; and a grain boundary between adjacent crystallites of the plurality of crystallites and comprising a second composition having a layered $\alpha$-NaFeO$_2$-type structure, a cubic structure, or a combination thereof, wherein a concentration of cobalt in the grain boundary is greater than a concentration of cobalt in the crystallites.

14. A method of manufacturing a particle, the method comprising:

combining a lithium compound, a cobalt compound, and a nickel compound to form a mixture;

heat treating the mixture at about 30 to about 200° C. to form a dried mixture;

heat treating the dried mixture at about 200 to about 500° C. for about 0.1 to about 5 hours; then heat treating at 600 to about 900° C. for about 0.1 to about 10 hours to manufacture the particle, wherein the particle comprises a plurality of crystallites comprising a first composition having a layered $\alpha$-NaFeO$_2$-type structure and comprising Li, Ni, Co and O, wherein the Li is present in an amount of about 0.1 to about 1.3 moles, per mole of the first composition, nickel is present in an amount of about 0.1 to about 0.79 mole or about 0.91 to about 0.99 mole, per mole of the first composition, cobalt is present in an amount of 0 to about 0.5 mole, per mole of the first composition, and oxygen is present in an amount of about 1.7 to about 2.3 moles, per mole of the first composition; and a grain boundary between adjacent crystallites of the plurality of crystallites and comprising a second composition having a layered $\alpha$-NaFeO$_2$-type structure, a cubic structure, or a combination thereof, wherein a concentration of cobalt in the grain boundary is greater than a concentration of cobalt in the crystallites.

* * * * *